United States Patent
Bourbonnais et al.

(10) Patent No.: US 9,141,424 B2
(45) Date of Patent: Sep. 22, 2015

(54) ACHIEVING CONTINUOUS AVAILABILITY FOR PLANNED WORKLOAD AND SITE SWITCHES WITH NO DATA LOSS

(71) Applicant: International Business Machines Corporation, Armonk, NY (US)

(72) Inventors: Serge Bourbonnais, Palo Alto, CA (US); Paul M. Cadarette, Hemet, CA (US); Martin W. Cocks, Hursely (GB); Michael G. Fitzpatrick, Raleigh, NC (US); Pamela L. McLean, Raleigh, NC (US); David B. Petersen, Great Falls, VA (US); John S. Tilling, Hampshire (GB); Gregory W. Vance, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 13/803,724

(22) Filed: Mar. 14, 2013

(65) Prior Publication Data

US 2014/0282596 A1    Sep. 18, 2014

(51) Int. Cl.
| | |
|---|---|
| G06F 9/46 | (2006.01) |
| G06F 15/173 | (2006.01) |
| G06F 9/48 | (2006.01) |
| G06F 9/50 | (2006.01) |

(52) U.S. Cl.
CPC ............... *G06F 9/4856* (2013.01); *G06F 9/46* (2013.01); *G06F 9/461* (2013.01); *G06F 9/466* (2013.01); *G06F 9/48* (2013.01); *G06F 9/485* (2013.01); *G06F 9/4806* (2013.01); *G06F 9/4843* (2013.01); *G06F 9/4862* (2013.01); *G06F 9/4868* (2013.01); *G06F 9/4875* (2013.01); *G06F 9/50* (2013.01); *G06F 9/5005* (2013.01); *G06F 9/5083* (2013.01); *G06F 9/5088* (2013.01)

(58) Field of Classification Search
None
See application file for complete search history.

(56) References Cited

U.S. PATENT DOCUMENTS

| | | | |
|---|---|---|---|
| 6,983,317 B1 * | 1/2006 | Bishop et al. | 709/223 |
| 8,539,045 B2 * | 9/2013 | Kang et al. | 709/219 |
| 2003/0069903 A1 * | 4/2003 | Gupta et al. | 707/204 |
| 2006/0200454 A1 * | 9/2006 | Kaluskar et al. | 707/3 |
| 2009/0037554 A1 * | 2/2009 | Herington | 709/213 |
| 2009/0064136 A1 * | 3/2009 | Dow et al. | 718/1 |
| 2009/0157766 A1 * | 6/2009 | Shen et al. | 707/202 |
| 2010/0094948 A1 * | 4/2010 | Ganesh et al. | 709/212 |
| 2010/0250746 A1 * | 9/2010 | Murase | 709/226 |
| 2011/0145471 A1 * | 6/2011 | Corry et al. | 711/6 |
| 2011/0197039 A1 * | 8/2011 | Green et al. | 711/162 |
| 2013/0198739 A1 * | 8/2013 | Razdan et al. | 718/1 |
| 2013/0282653 A1 * | 10/2013 | Tandra Sistla et al. | 707/610 |
| 2014/0208111 A1 * | 7/2014 | Brandwine et al. | 713/171 |

* cited by examiner

*Primary Examiner* — Charles Swift
(74) *Attorney, Agent, or Firm* — Cantor Colburn LLP; William A. Kinnaman, Jr.

(57) ABSTRACT

Embodiments of the disclosure are directed to methods, systems and computer program products for performing a planned workload switch. A method includes receiving a request to switch a site of an active workload and stopping one or more long running processes from submitting a new request to the active workload. The method also includes preventing a new network connection from accessing the active workload and processing one or more transactions in a queue of the active workload for a time period. Based on a determination that the queue of the active workload is not empty after the time period, the method includes aborting all remaining transactions in the queue of the active workload. The method further includes replicating all remaining committed units of work to a standby workload associated with the active workload.

17 Claims, 4 Drawing Sheets

ACHIEVING CONTINUOUS AVAILABILITY FOR PLANNED WORKLOAD AND SITE SWITCHES WITH NO DATA LOSS

BACKGROUND

The present disclosure relates generally to methods and systems for controlling switching in redundant computing and storage systems, and more specifically, to methods and systems for performing a planned workload or site switch without data loss.

Currently available redundant systems provide the capability to perform both a planned or unplanned workload and site switch in seconds. These redundant systems include two or more independent systems that each has an instance of a workload, with one instance being an active instance and the other being a standby workload. In some cases, after the execution of a planned workload or site switch, it is possible that not all of the pending transactions were processed by the active workload. In addition, after the execution of a planned workload or site switch, it is also possible that not all of the committed of units of work, or changes to the database, have been replicated from the active workload to the standby workload.

If all of the pending transactions are not processed by the active workload or if all of the committed units of work have not been replicated from the active workload to the standby workload before the workload or site switch is complete, the data integrity of the redundant computing and storage systems may be compromised.

BRIEF SUMMARY

According to one embodiment of the present disclosure, a method for performing a planned workload switch includes receiving a request to switch a site of an active workload and stopping one or more long running processes from submitting a new request to the active workload. The method also includes preventing a new network connection from accessing the active workload and processing one or more transactions in a queue of the active workload for a time period. Based on a determination that the queue of the active workload is not empty after the time period, the method includes aborting all remaining transactions in the queue of the active workload. The method further includes replicating all remaining committed units of work to a standby workload associated with the active workload.

According to another embodiment of the present disclosure, a system for performing a planned workload switch includes a first location including a computing and storage system in communication with a controller, the computing and storage system comprising one or more workloads and a second location including a second computing and storage system in communication with the controller, the second computing and storage system comprising one or more workloads, wherein each of the one or more workloads includes a designation as an active workload or a standby workload. The controller is configured to receive a request to switch a site of an active workload and stop one or more long running processes from submitting a new request to the active workload. The controller prevents a new network connection from accessing the active workload and process one or more transactions in a queue of the active workload for a time period. Based on a determination that the queue of the active workload is not empty after the time period, the controller aborts all remaining transactions in the queue of the active workload and replicates all remaining committed units of work to a standby workload associated with the active workload.

According to yet another embodiment of the present disclosure, a computer program product for achieving continuous availability for performing a planned workload switch includes a computer readable storage medium having computer readable program code embodied therewith. The computer readable program code including computer readable program code configured to receive a request to switch a site of an active workload and stop one or more long running processes from submitting a new request to the active workload. The computer readable program code is also configured to prevent a new network connection from accessing the active workload and process one or more transactions in a queue of the active workload for a time period. Based on a determination that the queue of the active workload is not empty after the time period, the computer readable program code is also configured to abort all remaining transactions in the queue of the active workload. The computer readable program code is further configured to replicate all remaining committed units of work to a standby workload associated with the active workload.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments, methods, systems and computer program products are provided that will ensure that all queued transactions have been processed and committed units of work have been replicated to prevent data loss as part of a planned workload switch or planned site switch.

Figure 1:
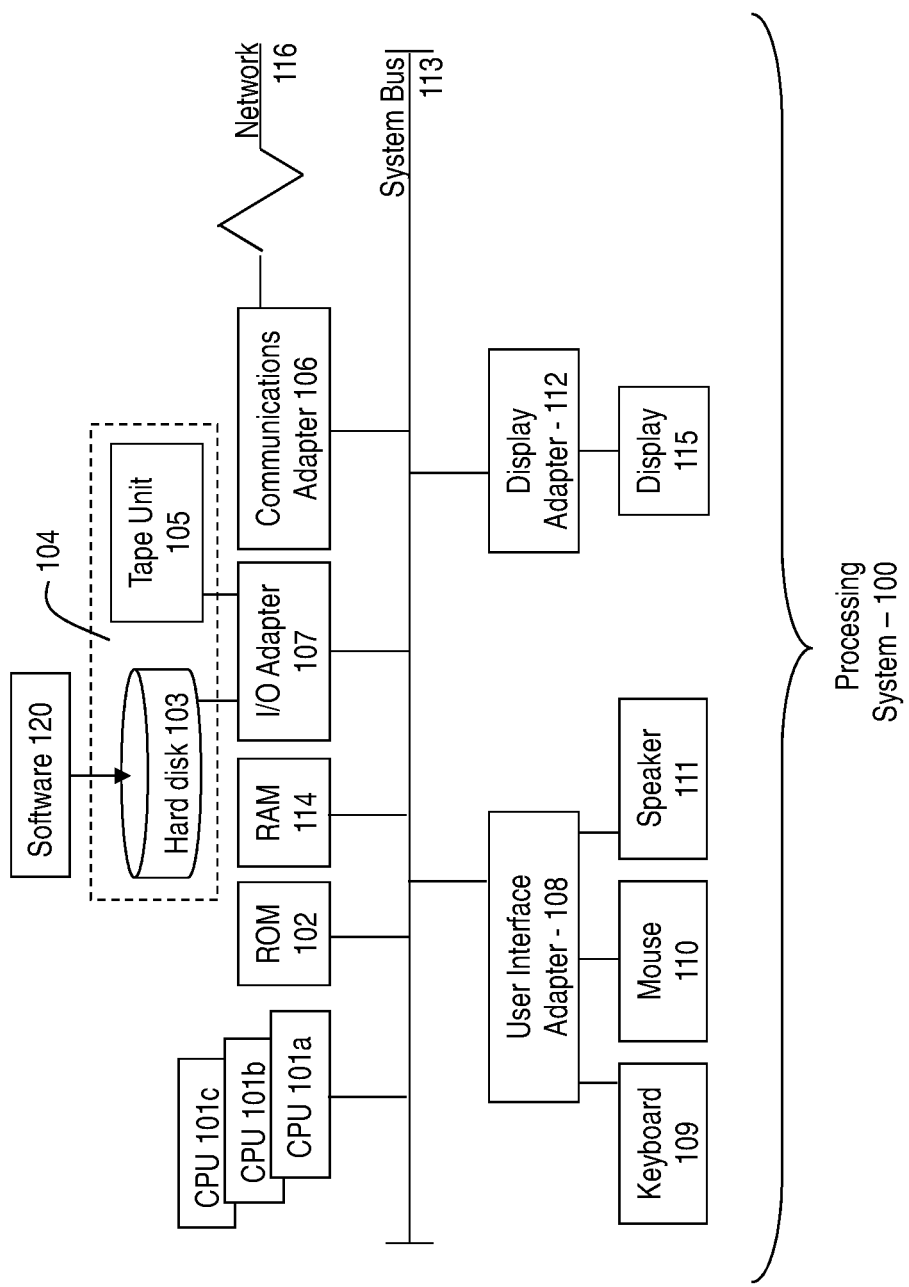
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) or Fibre Connection (FICON™) adapter that communicates with a hard disk 103 and/or tape storage drive 105 or any other similar component. I/O adapter 107, hard disk 103, and tape storage device 105 are collectively referred to herein as mass storage 104. Software 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the z/OS™ and AIX™ operating systems from IBM Corporation to coordinate the functions of the various components shown in FIG. 1.

Figure 2A:
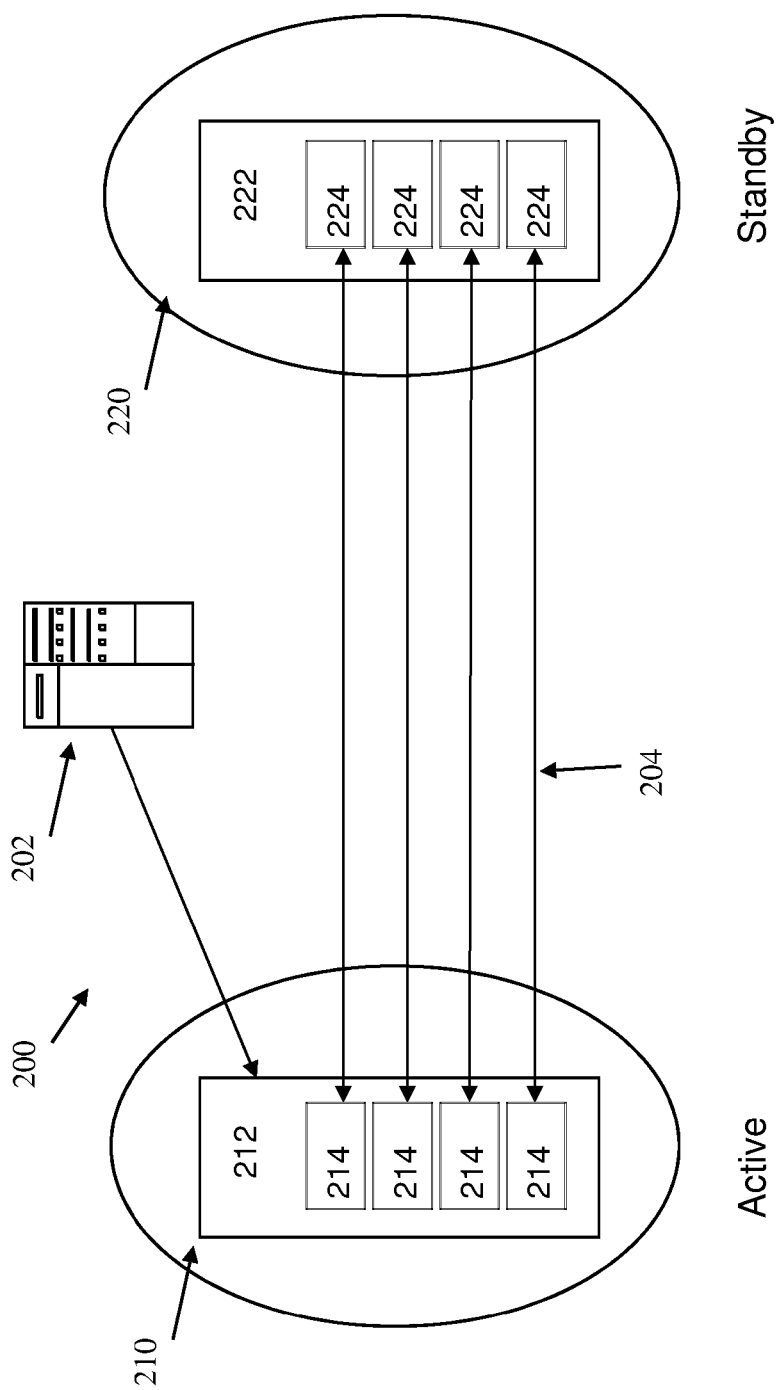
FIGS. 2A-2B are block diagrams of redundant computing and storage systems for practice of the teachings herein.
Figure 2B:
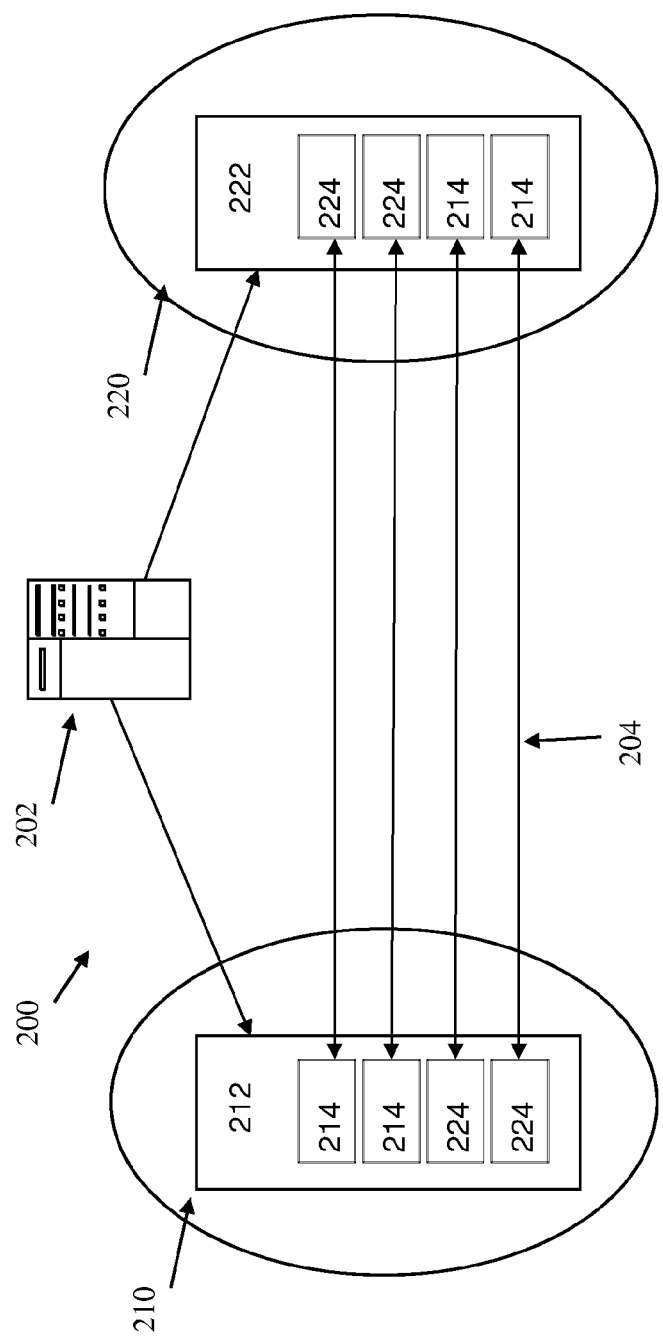

Referring now to FIGS. 2A and 2B, block diagrams illustrating redundant computing and storage system 200 for practice of the teachings herein are shown. The redundant computing and storage system 200 is designed to provide continuous availability, disaster recovery, and cross-site workload balancing. As illustrated, the computing and storage system 200 includes one or more controllers 202, a first site 210 and a second site 220. In exemplary embodiments, the controller 202 may be a processing system similar to the one described in more detail above with reference to FIG. 1. In addition, the controller 202 may include one or more processing systems that are disposed at the first site, the second site, a combination of the two sites, or at a third site. In exemplary embodiments, the first site 210 and the second site 220 may be in different, potentially remote, physical locations. Both the first site 210 and the second site include one or more computing and storage systems 212, 222 that can be configured to have one or more workloads 214, 224 that are managed by the controller 202. As used herein, a workload includes a database, or a file system, a set of applications or resources that use, access and/or manage the database and/or file system.

In exemplary embodiments, a workload includes a database that can be accessed and updated by multiple applications. In one example, the workload may include a database of banking records and the applications may include internal applications or long running processes that are used to generate statements or run reports. In addition, the applications may include online or network based applications that are used to post transactions to the database. In exemplary embodiments, the workload may include a queue that is used to temporarily store received transactions until the workload is able to process these transactions and update the database.

In exemplary embodiments, for each site 210, 220 managed by the controller 202, at any given point in time one of the sites 210, 220 will be the active site and the other will act as standby site. In embodiments where the sites 210, 220 include multiple workloads 214, 224, a given site can be the active site for one workload 214 while it is standby site for another workload 224. It is the routing for each workload 214, 224 that determines which site 210, 220 is active and which site is standby for a given workload. For example, in the redundant computing and storage system 200 shown in FIG. 2A the first site 210 is considered to be an active site because the controller 202 is instructing a distributor (not shown), or router, to route all transactions to active workloads 214 located at the first site 210. In turn, the workloads 214 at the active site are replicating data 204 with the standby workloads 224 at the second site 220, which is considered to be a standby site. In exemplary embodiments, the data replication 204 is configured to permit replication in both directions, however data only replicates in one direction at a time. In exemplary embodiment, a standby workload 224 is waiting for work, and is available to process work at any time should there be a planned or unplanned workload switch, resulting in transactions being routed to the standby workload 224. In another example, in the redundant computing and storage system 200 shown in FIG. 2B neither the first site 210 nor the second site 220 are considered active sites because the controller 202 is routing transactions to active workloads 214 located at both the first site 210 and the second site 220.

In exemplary embodiments, the software data replication in the redundant computing and storage system 200 is asynchronous. The active workloads 214 are configured to perform database updates and the write operation can be completed independent of the replication process. When a transaction commits changes, the replication software captures the updates as soon as it is committed and sends the updates to the standby site where it gets applied in real time to a running copy of the database. In exemplary embodiments, during replication an update may be sent to a standby site prior to being committed on the active site, but the updates will not be processed on the standby site until they have been committed on the active site. If replication is disrupted for any reason, when restored, the replication engines have logic to know where the replication was disrupted and is able to transmit only those changes made after the disruption.

In exemplary embodiments, a planned switch may be executed to switch the active site for one or more workloads. In cases where all of the workloads on a site are switched, the switch is referred to as a site switch. In cases where not all of the workloads on a site are switched, the switch is referred to as a workload switch. When a planned site switch is performed, the planned workload switch logic is performed in parallel for all the active workloads executing at the specified site.

Figure 3:
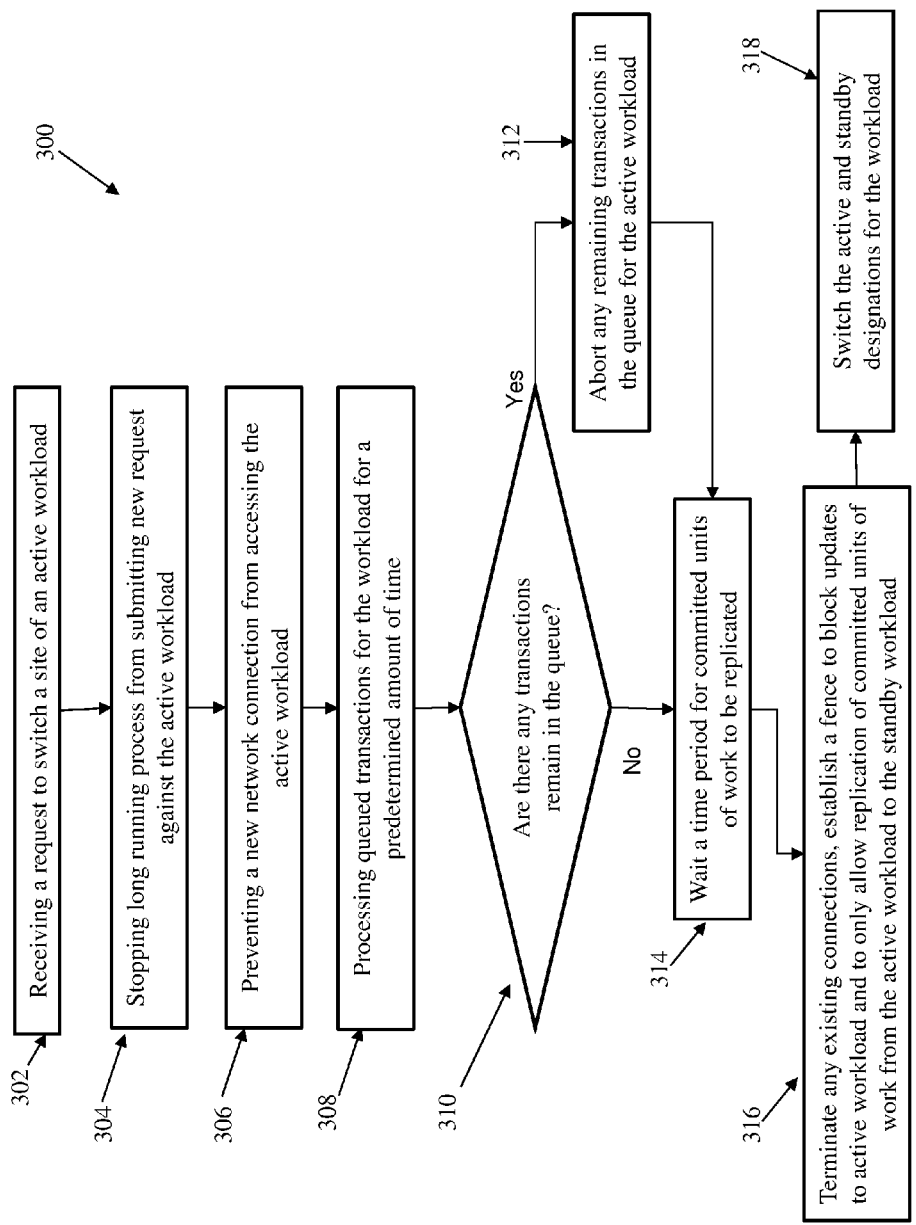
FIG. 3 is a flow diagram of a method for performing a planned workload switch in accordance with an exemplary embodiment.

Referring now to FIG. 3, a flow diagram of a method 300 for performing a planned workload switch in accordance with an exemplary embodiment is shown. As shown at block 302, the method begins by receiving a request to switch the site of an active workload. Next, as shown at block 304, the method 300 includes stopping one or more long running processes from submitting new requests against the active workload. For example, stopping one or more long running processes (e.g., batch) stops local work from being submitted to the workload. In exemplary embodiments, the long running processes may be batch processes, internal processes or local processes that access the active workload. Next, as shown at block 306, the method 300 includes preventing any new network connections from accessing the active workload. For example, preventing any new network connections stops remote work from being submitted to the workload. In exemplary embodiments, the connections may include network connections such as TCP/IP connections or the like. Additionally, the existing connections may include both network connections and persistent connections used by batch processes.

Continuing with reference to FIG. 3, the method 300 includes processing any transactions in a queue for the active workload for a predetermined amount of time, or until the queue is empty, whichever occurs first as shown at block 308. Next, as shown at decision block 310, the method 300 includes determining if any transactions remain in the queue for the active workload after the predetermined amount of time has passed. If any transactions remain in the queue after the predetermined amount of time, the method proceeds to block 312 and aborts the transactions remaining in the queue for the active workload. Otherwise, the method proceeds to block 314 and waits a time period for committed units of work to be replicated.

Continuing with reference to FIG. 3, as shown at block 316 the method 300 includes terminating any existing connections to the active workload and establishing a fence to block updates to active workload and only allow replication of committed units of work from the active workload to the standby workload. In exemplary embodiments, the fence is software that is configured to prevent access to the workload with the exception of replication of the workload. In exemplary embodiments, a time period may be set for replicating the remaining committed units of work and if any committed units of work remain after the time period has expired, the remaining units of work will be stranded. In exemplary embodiments, a user interface is provided that is configured to allow a user to select whether to allow replication to continue or not after the time period has expired. As shown at block 318, the method 300 completes by switching the active and standby designations for the workload.

In exemplary embodiments, the controller 202 includes a user interface that allows a user to stop batch, or long running, processes to prevent new transactions being submitted against the active workload instance. In addition, the user interface will allow the user to set the time limits for processing all queued transactions for the active workloads and to wait for all committed units of work to be replicated from the active workload instances to the standby workload instances. In exemplary embodiments, the method described with reference to FIG. 3, may be incorporated into existing routing instructions or commands on the controller.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardwarebased systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for performing a planned workload switch, the method comprising:
    receiving, by a processing device, a request to switch a site of an active workload;
    stopping one or more long running processes from submitting a new request to the active workload;
    preventing a new network connection from accessing the active workload;
    processing one or more transactions in a queue of the active workload for a time period;
    based on a determination that the queue of the active workload is not empty after the time period, aborting all remaining transactions in the queue of the active workload; and
    replicating all remaining committed units of work to a standby workload associated with the active workload, wherein replicating comprises:
        waiting a second period of time for the committed units of works to be replicated;
        determining if all of the committed units of works were replicated during the second period of time; and
        based on a determination that all of the committed units of works were not replicated during the second period of time, presenting user with an option to strand any of the all remaining committed units of works that are not replicated during a second period of time or to wait an additional amount of time.

2. The method of claim 1, further comprising terminating existing connections to the active workload after processing the one or more transactions in the queue of the active workload.

3. The method of claim 1, further comprising establishing a fence to block updates to the active workload after replicating units of work to a standby workload associated with the active workload.

4. The method of claim 1, further comprising updating a designation of the site for the active workload.

5. The method of claim 1, wherein the one or more long running process includes a long running internal process.

6. The method of claim 1, wherein the new network connection is a TCP/IP connection.

7. A computer program product for performing a planned workload switch comprising:
    a non-transitory computer readable storage medium having computer readable program code embodied therewith, the computer readable program code comprising:
    computer readable program code configured to:
    receive a request to switch a site of an active workload;
    stop one or more long running processes from submitting a new request to the active workload;
    prevent a new network connection from accessing the active workload;
    process one or more transactions in a queue of the active workload for a time period;
    based on a determination that the queue of the active workload is not empty after the time period, abort all remaining transactions in the queue of the active workload; and replicate all remaining committed units of work to a standby workload associated with the active workload, wherein replicating comprises:
  waiting a second period of time for the committed units of works to be replicated;
  determining if all of the committed units of works were replicated during the second period of time; and
  based on a determination that all of the committed units of works were not replicated during the second period of time, presenting user with an option to strand any of the all remaining committed units of works that are not replicated during a second period of time or to wait an additional amount of time.

8. The computer program product of claim 7, wherein the computer readable program code is further configured to terminate existing connections to the active workload after processing the one or more transactions in the queue of the active workload.

9. The computer program product of claim 8, wherein the computer readable program code is further configured to establish a fence to block updates to the active workload after replicating all remaining committed units of work to a standby workload associated with the active workload.

10. The computer program product of claim 7, wherein the computer readable program code is further configured to update a designation of the site for the active workload.

11. The computer program product of claim 7, wherein the one or more long running processes includes a long running internal process.

12. The computer program product of claim 7, wherein the new network connection is a TCP/IP connection.

13. A system comprising at least one processor for performing a planned workload switch, the system further comprising;
  a first location including a computing and storage system in communication with a controller, the computing and storage system comprising one or more workloads;
  a second location including a second computing and storage system in communication with the controller, the second computing and storage system comprising one or more workloads, wherein each of the one or more workloads includes a designation as an active workload or a standby workload;
the controller configured to:
  receive a request to switch a site of an active workload;
  stop one or more long running processes from submitting a new request to the active workload;
  prevent a new network connection from accessing the active workload;
  process one or more transactions in a queue of the active workload for a time period;
  based on a determination that the queue of the active workload is not empty after the time period, abort all remaining transactions in the queue of the active workload; and
  replicate all remaining committed units of work to a standby workload associated with the active workload, wherein replicating comprises:
    waiting a second period of time for the committed units of works to be replicated;
    determining if all of the committed units of works were replicated during the second period of time; and
    based on a determination that all of the committed units of works were not replicated during the second period of time, presenting user with an option to strand any of the all remaining committed units of works that are not replicated during a second period of time or to wait an additional amount of time.

14. The system of claim 13, wherein the controller is further configured to terminate existing connections to the active workload after processing the one or more transactions in the queue of the active workload.

15. The system of claim 13, wherein the controller is further configured to update a designation of the site for the active workload.

16. The system of claim 13, wherein the one or more long running processes includes a long running internal process.

17. The system of claim 13, wherein the new network connection is a TCP/IP connection.

* * * * *